US010155209B2

(12) United States Patent
Yokoyama et al.

(10) Patent No.: US 10,155,209 B2
(45) Date of Patent: Dec. 18, 2018

(54) DISPERSANT

(71) Applicant: NIPPON PAPER INDUSTRIES CO., LTD., Kita-ku (JP)

(72) Inventors: Shigeki Yokoyama, Yamaguchi (JP); Tadafumi Hashimoto, Yamaguchi (JP); Takahito Yamaguchi, Yamaguchi (JP); Masanobu Kawamura, Yamaguchi (JP); Hideo Hosaka, Yamaguchi (JP); Takeshi Iimori, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 6 days.

(21) Appl. No.: 14/903,970

(22) PCT Filed: Jul. 25, 2014

(86) PCT No.: PCT/JP2014/069734
§ 371 (c)(1),
(2) Date: Jan. 8, 2016

(87) PCT Pub. No.: WO2015/016152
PCT Pub. Date: Feb. 5, 2015

(65) Prior Publication Data
US 2016/0151754 A1    Jun. 2, 2016

(30) Foreign Application Priority Data
Aug. 1, 2013 (JP) .................. 2013-160512

(51) Int. Cl.
C04B 24/38 (2006.01)
B01F 17/00 (2006.01)
C04B 28/02 (2006.01)
C08L 97/02 (2006.01)
C08H 8/00 (2010.01)
C04B 40/00 (2006.01)
C04B 24/10 (2006.01)
C04B 24/26 (2006.01)
C04B 103/40 (2006.01)

(52) U.S. Cl.
CPC ...... *B01F 17/0092* (2013.01); *B01F 17/0021* (2013.01); *B01F 17/0028* (2013.01); *B01F 17/0057* (2013.01); *C04B 24/38* (2013.01); *C04B 28/02* (2013.01); *C04B 40/0025* (2013.01); *C04B 40/0039* (2013.01); *C08H 8/00* (2013.01); *C08L 97/02* (2013.01); *C04B 24/10* (2013.01); *C04B 24/2641* (2013.01); *C04B 2103/408* (2013.01)

(58) Field of Classification Search
CPC ......... C08L 97/02; C08L 97/005; C08H 8/00; C04B 24/38; C04B 24/10; C04B 24/2641; C04B 103/408
See application file for complete search history.

(56) References Cited

U.S. PATENT DOCUMENTS

| 4,073,658 | A | 2/1978 | Ohtani et al. |
| 5,880,182 | A | 3/1999 | Minomiya et al. |
| 6,893,497 | B2 | 5/2005 | Einfeldt et al. |
| 2011/0028672 | A1* | 2/2011 | Dahlman ............ C08B 37/0003 527/103 |
| 2014/0216304 | A1* | 8/2014 | Hou ...................... C04B 24/003 106/708 |
| 2016/0151754 | A1* | 6/2016 | Yokoyama .............. C04B 28/02 106/804 |

FOREIGN PATENT DOCUMENTS

| CN | 101974091 A | 2/2011 |
| EP | 2 067 793 A1 | 6/2009 |
| JP | 52-109522 | 9/1977 |
| JP | 3-64589 A | 3/1991 |
| JP | 7-172889 A | 7/1995 |
| JP | 2011-240224 A | 12/2011 |
| JP | 2012-219416 A | 11/2012 |
| WO | WO 2012/155342 A1 | 11/2012 |

OTHER PUBLICATIONS

Combined Chinese Office Action and Search Report dated Aug. 3, 2016 in Patent Application No. 201480043011.6 (with English Translation and English Translation of Category of Cited Documents).

(Continued)

*Primary Examiner* — Michael A Salvitti
(74) *Attorney, Agent, or Firm* — Oblon, McClelland, Maier & Neustadt, L.L.P.

(57) ABSTRACT

The present invention provides a hydrolysate of a lignocellulosic material, and specifically a method of using a hydrolysis treatment liquid obtained by a hydrolysis treatment of a lignocellulosic material before kraft cooking in order to obtain dissolving pulp for uses other than use of a fuel. Specifically, the present invention provides a dispersant containing the hydrolysate obtained by hydrolysis treatment of the lignocellulosic material. The dispersant of the present invention has excellent dispersibility for a substance such as an inorganic substance and an organic substance without limitation of powder, particulate, granular, fiber, and flat plane shapes.

13 Claims, No Drawings

(56) References Cited

OTHER PUBLICATIONS

Wang Li-jiu et al., "Preparations and Applications of Cellulose-Based Concrete High-Range Water-Reducing Agent", Journal of Dalian University of Technology, vol. 48, No. 5, Sep. 2008, pp. 679-684 ( with English abstract).
Mitsuru Hayashi, "Utilization and Properties of Lignin", Japan Tappi Journal, vol. 20; No. 4, Total 15 Pages, (Apr. 1966) (with Partial English Translation).
International Search Report dated Sep. 30, 2014 in PCT/JP14/069734 Filed Jul. 25, 2014.
Office Action dated Mar. 8, 2017 in Chinese Patent Application No. 201480043011.6 with unedited computer generated English translation.
Zhu Jishan, et al, "Report on Development of H—C Water-Reducing Agent", Shanxi Forestry Science and Technology, No. 4, 1981, pp. 5-17 with partial English translation.
Extended European Search Report dated Feb. 8, 2017 in Patent Application No. 14831497.4.
Cheng He, et al., "Preparation of Concrete Plasticizer from Corncob Residue of Enzymatic Hydrolysis" Journal of Cellulose Science and Technology, vol. 19, No. 1, XP008171475, Mar. 2011, 6 Pages (with English abstract).
European Office Action dated Nov. 2, 2017, in European Patent Application No. 14 831 497.4, filed Jul. 25, 2014.

\* cited by examiner

DISPERSANT

CROSS-REFERENCE TO RELATED APPLICATIONS

This application is a National Stage of PCT/JP2014/069734, which was filed on Jul. 25, 2014. This application is based upon and claims the benefit of priority to Japanese Application No. 2013-160512, which was filed on Aug. 1, 2013.

TECHNICAL FIELD

The present invention relates to a dispersant containing a hydrolysate of a lignocellulosic material.

BACKGROUND

Production of dissolving pulp from a lignocellulosic material requires selective removal of hemicellulose and lignin in the lignocellulosic material in order to increase the cellulose purity. As an index representing the cellulose purity, an α-cellulose content is generally used. As the content is larger, the quality of the dissolving pulp is higher. As methods of producing dissolving pulp, two methods, namely, an acidic sulfite cooking method and a hydrolysis-kraft cooking method have been known. In the acidic sulfite cooking method, large amounts of hemicellulose and lignin in a lignocellulosic material are removed at one time at a cooking process. In the hydrolysis-kraft cooking method, most of hemicellulose is removed by acid hydrolysis at a hydrolysis process, and a small amount of hemicellulose and most of lignin are then removed at a kraft cooking process. At the hydrolysis process, water is added to the lignocellulosic material, followed by heating, to eliminate an acetyl group in the hemicellulose, thereby generating acetic acid. Thus, the state automatically becomes acidic, and the acid hydrolysis advances. Therefore, the hydrolysis process is generally performed without external addition of acid (Patent Literature 1).

RELATED ART DOCUMENTS PATENT LITERATURE

Patent Literature

Patent Literature 1: Japanese Patent Application Laid-Open No. 2012-219416

SUMMARY OF THE INVENTION

Problem to be Solved by the Invention

It is known that use of a hydrolysate obtained at the hydrolysis process in the hydrolysis-kraft cooking method can be used as energy in a pulp production process. For example, the hydrolysate is used as a fuel in a pulp production plant with black liquor that is produced at the cooking process. As also described in Patent Literature 1, the hydrolysis-kraft cooking method is a method for obtaining dissolving pulp. Therefore, this method has not been used for use in the pulp production process as described above.

An object of the present invention is to provide uses other than use as a fuel, of a hydrolysate of a lignocellulosic material. The hydrolysate is obtained, for example, at the hydrolysis process before the kraft cooking process in the production of dissolving pulp.

Solution to Problem

The present invention relates to a dispersant containing the hydrolysate of a lignocellulosic material.

Solution to Problem

The present invention is the following [1] to [14].
[1] A dispersant comprising a hydrolysate of a lignocellulosic material.
[2] The dispersant according to [1], wherein the hydrolysate has a weight average molecular weight of 1,000 to 5,000.
[3] The dispersant according to [1] or [2], wherein
the hydrolysate contains an oligosaccharide and/or a polysaccharide, and lignin,
a contained amount of the oligosaccharide and the polysaccharide in the hydrolysate is 50% by weight to 80% by weight relative to the solid content of a hydrolysate, and
a contained amount of the lignin in the hydrolysate is 1 to 10% by weight relative to the solid content of the hydrolysate.
[4] The dispersant according to any one of [1] to [3], further comprising at least one kind of compound selected from the group consisting of the following components (A) to (C):
(A) a compound having a carboxyl group and/or a salt thereof;
(B) a compound having an acid group and a polyalkylene glycol chain; and
(C) a compound having a sulfonic acid group and/or a salt thereof.
[5] The dispersant according to any one of [1] to [4], which is a dispersant for an inorganic substance.
[6] The dispersant according to any one of [1] to [4], which is a dispersant for an organic substance.
[7] The dispersant according to any one of [1] to [4], which is a dispersant for cement.
[8] A dispersion composition comprising the dispersant according to any one of [1] to [7], a substance to be dispersed, and a dispersion medium.
[9] The dispersion composition according to [8], wherein the substance to be dispersed is a hydraulic material.
[10] The dispersion composition according to [9], wherein the hydraulic material contains cement.
[11] A hydraulic composition comprising the dispersant according to any one of [1] to [7] and a hydraulic material.
[12] A cement composition comprising the dispersant according to any one of [1] to [7] and cement.
[13] A method of producing a dispersion composition comprising dispersing a substance to be dispersed and a dispersion medium using the dispersant according to any one of [1] to [7].
[14] A method of dispersing a substance to be dispersed and a dispersion medium using the dispersant according to any one of [1] to [7].

Effect of the Invention

According to the present invention, the dispersant of the present invention exhibits excellent dispersibility for various materials such as an inorganic substance, an organic substance, and cement. In particular, when the dispersant is for cement, the dispersibility of the dispersant is more excellent than that of a conventional AE water reducing agent (lignin sulfonate salts and sodium gluconate), and the coagulation properties can be appropriately controlled according to demands of use and the like. The present invention can provide a method of using a hydrolysate other than use as a fuel, the hydrolysate is obtained by a hydrolysis treatment of a lignocellulosic material before kraft cooking to obtain dissolving pulp for uses.

EMBODIMENTS FOR CARRYING OUT THE INVENTION

A dispersant of the present invention contains a hydrolysate of a lignocellulosic material.

In the present invention, the lignocellulosic material may be a material containing lignin and cellulose. In the material, lignin and cellulose may be chemically or physically bonded to each other. Further, the lignocellulosic material usually contains hemicellulose.

In the present invention, the lignocellulosic material is not particularly limited, but examples thereof may include pulp raw materials such as woods and non-woods. Examples of the woods may include acacia (*Acacia*), softwoods such as red pine (*Pinus densiflora*), black pine (*Pinus thunbergii*), Sakhalin fir (*Abies sachalinensis*), Yezo spruce (*Picea jezoensis*), fir (*Abies firma*), hemlock spruce (*Tsuga sieboldii*), Japanese ceder (*Cryptomeria japonica*), Japanese cypress (*Chamaecyparis obtuse*), Japanese larch (*Larix kaempferi*), Japanese spruce (*Picea jezoensis* var. *hondoensis*), cypress (*Thujopsis dolabrata*), Douglas fir (*Pseudotsuga menziesii*), hemlock (*Tsuga heterophylla*), spruce (*Picea*), Balsam fir (*Abies balsamea* L.), and Radiata Pine (*Pinus radiata*), and hardwoods such as oak (*Quercus*), chinquapin (*Castanopsis*), beech (*Fagus*), birch (*Betula*), alder (*Alnus japonica*), Japanese white birch (*Betula platyphylla*), poplar (*Populus*), eucalyptus (*Eucalyptus*), mangrove (*Rhizophora mangle*), and lauan (*Dipterocarpaceae*). As the non-woods, part of plant such as bast fibers, seed hair fibers, and stem fibers is often used. Examples of the non-woods may include bamboo (*Bambuseae*), sugarcane (bagasse; *Saccharum officinarum*), banana (*Musa* spp.), kenaf (*Hibiscus cannabinus*), paper mulberry (*Broussonetia kazinoki×B. papyrifera*), paper birch (*Edgeworthia chrysantha*), ganpi (*Diplomorpha sikokiana*), flax (*Linum usitatissimum*), hemp (*Cannabis*) and jute (*Corchorus capsularis*), cotton plant (*Gossypium* spp.), rice straw, and wheat straw. The lignocellulosic material may be only one kind thereof or a combination of two or more kinds thereof. The lignocellulosic material may be wood chips (hardwood chips and softwood chips) or non-wood chips.

The hydrolysate of the lignocellulosic material is a product obtained by a hydrolysis treatment of the lignocellulosic material. A method for the hydrolysis treatment is not particularly limited, but examples thereof may include a method using an organic acid that is released from the lignocellulosic material by blowing steam of high temperature on the lignocellulosic material, and a method in which the lignocellulosic material is treated in an acid solution. Among these, the method using an organic acid that is released from the lignocellulosic material is preferred. The hydrolysate may contain the aforementioned organic acid or the acid solution. Examples of the organic acid may include acetic acid and oxycarboxylic acid. Examples of the acid solution may include a solution of mineral acid such as sulfuric acid and sulfurous acid and a solution of an organic acid.

Conditions of the hydrolysis treatment are not particularly limited. Examples of a device may include an autoclave. A treatment temperature is preferably 140° C. or higher. The upper limit is preferably 200° C. or lower. The temperature is preferably 140° C. or higher and 200° C. or lower. A treatment time is preferably 15 minutes or more, and more preferably 20 minutes or more. The upper limit is preferably 120 minutes or less, and more preferably 90 minutes or less. The treatment time is preferably 15 minutes to 120 minutes, and more preferably 20 minutes to 90 minutes.

One example of the hydrolysis treatment is as follows. A liquid phase or a vapor phase of water, a solution of 2% by weight or less mineral acid, or an aqueous 2% by weight or less organic acid solution (preferably water) is brought into contact with the lignocellulosic material such as wood chips and treated at a treatment temperature of 140 to 200° C., and preferably 150 to 170° C. for 15 to 120 minutes, and preferably 20 to 90 minutes using a device such as an autoclave. During the treatment, a catalyst such as mineral acid and sulfur dioxide may be added.

The pH of the liquid phase or the vapor phase is preferably 2 or more, and more preferably 3 or more. The upper limit is preferably 5 or less, and more preferably 4 or less. Therefore, the pH is preferably 2 to 5, and more preferably about 3 to about 4. The liquid ratio of the liquid phase or the vapor phase relative to the weight (absolute dry amount) of the lignocellulosic material is preferably 0.5 L/kg or more, and more preferably 1.2 L/kg or more. The upper limit is preferably 5.0 L/kg or less, and more preferably 3.5 L/kg or less. The liquid ratio is preferably about 0.5 to about 5.0 L/kg, and more preferably about 1.2 to about 3.5 L/kg. Accordingly, the reaction efficiency can be enhanced.

The hydrolysate may be a product itself obtained by the hydrolysis treatment or a product obtained by the hydrolysis treatment and further subjected to post-treatment. Examples of the post-treatment may include neutralization, modification with a reducing saccharide under a hot alkaline condition, extraction of furan such as furfural, and concentration treatment. The post-treatment may be one kind of the treatment, or a combination of two or more kinds thereof.

The neutralization may be performed by the hydrolysis treatment followed by addition of a neutralizer. Example of the neutralizer may include sodium hydroxide, a mixture of sodium hydroxide and sodium sulfide, and cooking liquor. The sulfidity of the mixture of sodium hydroxide and sodium sulfide is preferably 5% to 50%, and more preferably 15% to 30%. The liquid ratio of a neutralization liquid to the weight (absolute dry amount) of the lignocellulosic material is preferably about 0.6 L/kg to about 5.5 L/kg, and more preferably about 1.5 L/kg to about 4.0 L/kg. It is preferable that the neutralization liquid contain an active alkali. The contained amount of the active alkali relative to the weight of the lignocellulosic material is preferably 5% to 30%, and more preferably 10% to 20%.

Conditions of the concentration treatment are not particularly limited. Examples of a treatment device may include an evaporator. The solid content in the product after the concentration treatment is preferably 20% or more. The upper limit is preferably 50% or less. Therefore, the solid content is preferably 20 to 50%. In one example of the concentration treatment, the hydrolysate is concentrated using an evaporator until the solid content becomes 20 to 50%. By the concentration treatment, the solid content concentration is increased. Therefore, effects such as prevention of putrefaction, decrease in physical distribution cost, and improvement in handlingability are obtained.

The properties of the hydrolysate are not particularly limited, and may be a liquid, or a solid such as a powder, a granule, and a pellet.

The weight average molecular weight of the hydrolysate is preferably 1,000 or more. The upper limit is preferably 5,000 or less. Therefore, the weight average molecular weight is preferably 1,000 to 5,000. Accordingly, the dispersibility of a substance to be dispersed can be enhanced. The weight average molecular weight can be measured by a known method. One example of the method is as follows. A molecular weight-retention time standard curve is formed by gel permeation chromatography (GPC) using a substance having a known molecular weight (for example, pullulan) as a standard sample. The weight average molecular weight of the hydrolysate can be measured using the curve. In GPC, OH pak SB806HQ+SB804HQ+SB802.5HQ (manufactured by Showa Denko K.K.) may be used as a column. As a mobile phase, an aqueous 0.05 M sodium tetraborate solution may be used.

The hydrolysate of the lignocellulosic material may contain a saccharide. Examples of the saccharide may include a monosaccharide, an oligosaccharide, and a polysaccharide. Examples of the monosaccharide may include pentasaccharides such as arabinose, xylose, xylulose, ribose, deoxyribose, and apiose, and hexasaccharides such as glucose, mannose, galactose, and fructose. The oligosaccharide and the polysaccharide mean saccharides other than a monosaccharide, that is, saccharides in which two or more same or different monosaccharides are bonded. Examples of the oligosaccharide and the polysaccharide may include disaccharides such as sucrose, lactose, maltose, trehalose, turanose, and cellobiose, trisaccharides such as raffinose, melezitose, and maltotriose, tetrasaccharides such as acarbose and stachyose, fructooligosaccharides, galactooligosaccharides, mannanoligosaccharides (for example, glucomannan), glycogen, starch (for example, amylose, and amylopectin), cellulose, dextrin, glucan (for example, $\beta$-1, 3-glucan (may be linear or branched, examples thereof may include curdlan, paramylon, pachyman, scleroglucan, and laminaran)), fructan (for example, inulin and levan), galactan, and xylan (arabinoxylan and glucuronoxylan). It is preferable that the polysaccharide and the oligosaccharide include so-called hemicellulose (mannanoligosaccharide, galactan, xylan, etc.,), and more preferably one or more kinds selected from the group consisting of glucomannan, galactan, arabinoxylan, and glucuronoxylan. The hydrolysate may contain one kind of the saccharide, or a combination of two or more kinds of the saccharides. The ratio by weight of the contained amount of the oligosaccharide and the polysaccharide relative to the whole solid content of the hydrolysate is preferably two or more times the ratio by weight of the contained amount of the monosaccharide.

It is preferable that the hydrolysate contain the oligosaccharide and/or the polysaccharide. The hydrolysate may contain only the oligosaccharide but not contain the polysaccharide, may contain the polysaccharide but not contain the oligosaccharide, or may contain the oligosaccharide and the polysaccharide. It is preferable that the hydrolysate contain the oligosaccharide and the polysaccharide. The hydrolysate may contain one kind of the oligosaccharide, or two or more kinds of the oligosaccharides. The hydrolysate may contain one kind of the polysaccharide, or two or more kinds of the polysaccharides.

The ratio by weight of the contained amount of the oligosaccharide and the polysaccharide relative to the whole solid content of the hydrolysate is not particularly limited, but is preferably 50% by weight or more, more preferably 55% by weight or more, and further preferably 60% by weight or more. The upper limit is generally 80% by weight or less. Therefore, the ratio by weight is preferably 50% by weight to 80% by weight, more preferably 55% by weight to 80% by weight, and further preferably 60% by weight to 80% by weight. When the hydrolysate contains only the oligosaccharide but does not contain the polysaccharide, the aforementioned ratio by weight means the ratio by weight of the contained amount of the oligosaccharide relative to the whole solid content of the hydrolysate. When the hydrolysate contains only the polysaccharide but does not contain the oligosaccharide, the aforementioned ratio by weight means the ratio by weight of the contained amount of the polysaccharide relative to the whole solid content of the hydrolysate.

Examples of a method of measuring the contained amounts of the oligosaccharide and the polysaccharide may include a method in which the oligosaccharide and the polysaccharide are decomposed into monosaccharides, and the amount of the monosaccharides is determined by high performance liquid chromatography (HPLC). Examples of a method of decomposing the oligosaccharide and the polysaccharide into monosaccharides may include a method of adding trifluoroacetic acid (TFA) to perform hydrolysis. Specific examples thereof may include a method of adding 1 M TFA in an amount two times of the hydrolysate (solid content) to completely perform hydrolysis at 105° C. for 3 hours. Herein, the "ratio by weight of the oligosaccharide and the polysaccharide" means the ratio of the total weight of the oligosaccharide and the polysaccharide in a hydrolysis treatment liquid relative to the whole solid content of the hydrolysis treatment liquid. When the hydrolysate contains the oligosaccharide but does not contain the polysaccharide, it means the ratio by weight of the oligosaccharide. When the hydrolysate contains the polysaccharide but does not contain the oligosaccharide, it means the ratio by weight of the polysaccharide.

The hydrolysate may contain a monosaccharide, or one or two or more kinds selected from the group consisting of glucose, mannose, arabinose, xylose, and galactose. When the hydrolysate contains glucose, the ratio by weight of the contained amount of glucose relative to the whole solid content of the hydrolysate is preferably 0.1% by weight or more, and more preferably 1.0% by weight or more. The upper limit is generally 5.0% by weight or less, and preferably 4.0% by weight or less. Therefore, when the hydrolysate contains glucose, the ratio by weight is preferably 0.1 by weight to 5.0% by weight, and more preferably 1.0% by weight to 4.0% by weight. When the hydrolysate contains mannose, the ratio by weight of the contained amount of mannose relative to the whole solid content of the hydrolysate is preferably 1.0% by weight or more, and more preferably 3.0% by weight or more. The upper limit is generally 10.0% or less, and preferably 8.0% by weight or less. Therefore, when the hydrolysate contains mannose, the ratio by weight is preferably 1.0% by weight to 10.0% by weight, and more preferably 3.0% by weight to 8.0% by weight. When the hydrolysate contains arabinose, the ratio by weight of the contained amount of arabinose relative to the whole solid content of the hydrolysate is preferably 2.0% by weight or more, and more preferably 3.0% by weight or more. The upper limit is generally 7.0% by weight or less, and preferably 5.0% by weight or less. Therefore, when the hydrolysate contains arabinose, the ratio by weight is preferably 2.0% by weight to 7.0% by weight, and more preferably 3.0% by weight to 5.0% by weight. When the hydrolysate contains xylose, the ratio by weight of the contained amount of xylose relative to the whole solid content of the hydrolysate is preferably 1.5% by weight or more, and more preferably 3.0% by weight or more. The upper limit is generally 10.0% by weight or less, and preferably 8.0% by weight or less. Therefore, when the hydrolysate contains xylose, the ratio by weight is preferably 1.0% by weight to 10.0% by weight, and more preferably 3.0% by weight to 8.0% by weight. When the hydrolysate contains galactose, the ratio by weight of the contained amount of galactose relative to the whole solid content of the hydrolysate is preferably 1.0% by weight or more, and more preferably 3.0% by weight or more. The upper limit is generally 8.0% by weight or less, and preferably 7.0% by weight or less. Therefore, when the hydrolysate contains galactose, the ratio by weight is preferably 1.0% by weight to 8.0% by weight, and more preferably 3.0% by weight to 7.0% by weight.

Examples of a method of measuring the contained amount of each monosaccharide may include an evaporative light scattering detection-high performance liquid chromatography method (ELSD-HPLC).

The hydrolysate may contain lignin. The ratio by weight of lignin relative to the whole solid content of the hydrolysate is not particularly limited, but is preferably 10% by weight or less. The lower limit is generally 1% or more. Therefore, the ratio by weight is preferably 1% by weight to 10% by weight.

It is preferable that the ratio by weight of the total amount of the oligosaccharide and the polysaccharide relative to the whole solid content of the hydrolysate be 50% by weight to 80% by weight and the ratio by weight of lignin be 1% by weight to 10% by weight.

In the present invention, it is more preferable that the weight average molecular weight of the hydrolysate be 1,000 to 5,000, the ratio by weight of the oligosaccharide and the polysaccharide relative to the whole solid content of the hydrolysate be 50 to 80%, and the ratio by weight of lignin be 1 to 10%. Accordingly, the dispersibility of a substance to be dispersed can be enhanced.

The hydrolysate may contain a component other than saccharides and lignin. Examples of the component may include an organic acid, oil, furan, and an ash content. The hydrolysate may contain one kind of the component other than saccharides and lignin, or a combination of two or more kinds thereof. Examples of the organic acid may include acetic acid and oxycarboxylic acid.

Examples of a method of measuring an organic acid may include an ion-exclusion high performance chromatography (HPLC) post-column chromatography reaction visible light detection method. Examples of a method of measuring oils may include a method of calculating the amount of n-hexane extract in accordance with JIS-K0102. Examples of a method of measuring furan may include a high performance liquid chromatography-ultraviolet light detection method (HPLC-UV). Examples of a method of measuring an ash content may include a measurement method in accordance with JIS-P8002 after weighting a sample in an ashing vessel, and removing the moisture by an electric heater.

The reason why the dispersant of the present invention exhibits excellent effects is not clear, but it is inferred that the effects are obtained by interaction of the oligosaccharide and/or the polysaccharide with the other substance such as lignin, which are contained in the hydrolysate of the lignocellulosic material.

Examples of measurement of the contained amount of lignin may include a method in which a methoxyl group is measured by Method of Viebock and Schwappach (see "Methods in lignin chemistry," pp. 336 to 340, 1994, Uni Press Co.), and the amount of lignin is calculated from the contained amount of the measured methoxyl group.

The dispersant of the present invention may contain one kind of the hydrolysate of the lignocellulosic material, or a combination of two or more kinds of the hydrolysates of the lignocellulosic materials having different kinds, different molecular weights, or different compositions as starting materials.

<Substance to be Dispersed>

A substance to be dispersed using the dispersant containing the hydrolysis treatment liquid of the present invention is not particularly limited, but examples thereof may include various inorganic substances and organic substances. The shape of the substance to be dispersed is not particularly limited, but examples thereof may include powder, particulate, granular, fiber, and flat plate shapes.

Examples of the inorganic substances may include, but not limited to, as follows:

silicates such as kaolin, aluminum silicate, clay, talc, mica, calcium silicate, sericite, and bentonite;

carbonates such as calcium carbonate, magnesium carbonate, barium carbonate, and basic lead carbonate;

sulfates such as calcium sulfate and barium sulfate;

chromates such as strontium chromate and pigment yellow;

molybdates such as zinc molybdate, calcium molybdate, and magnesium molybdate;

metal oxides such as alumina, antimony oxide, titanium oxide, cobalt oxide, triiron tetraoxide, diiron trioxide, trilead tetraoxide, lead monoxide, chromium oxide green, tungsten trioxide, and yttrium oxide;

metal hydroxides such as aluminum hydroxide, magnesium hydroxide, calcium hydroxide, iron hydroxide, and metatitanic acid;

metal carbides such as silicon carbide, tungsten carbide, boron carbide, and titanium carbide; aluminum nitride, silicon nitride, boron nitride, zirconia, barium titanate, satin white, carbon black, graphite, chrome yellow, mercury sulfide, ultramarine, Paris blue, titanium yellow, chrome vermilion, lithopone, copper acetoarsenite, nickel, silver, palladium, and lead zirconate titanate.

The average particle diameter of the inorganic substances is generally 100 μm or less, preferably 50 μm or less, and more preferably 0.1 μm or more and 50 μm or less. The inorganic substance may be used alone, or two or more kinds thereof may be used in combination.

Examples of the organic substances may include, but not limited to, as follows:

organic pigments such as fast yellow, disazo yellow, disazo orange, naphthol red, copper phthalocyanine-based pigments, phosphomolybdic acid salts, phosphotungstic acid salts, tannic acid salts, katanol, Tamol lake, isoindolinone yellow greenish, isoindolinone yellow reddish, quinacridone, dioxazine violet, perinone orange, perylene vermilion, perylene scarlet, perylene red, and perylene maroon;

synthetic resins such as polycarbonate, polyvinyl chloride, polymethyl methacrylate, and a fluororesin; and metal soaps such as aluminum stearate, zinc stearate, calcium stearate, magnesium stearate, a zinc stearate-calcium stearate composite, lead stearate, cadmium stearate, barium stearate, calcium laurate, and zinc laurate.

The average particle diameter of the organic substances is generally 100 μm or less, preferably 50 μm or less, and more preferably 0.1 μm or more and 50 μm or less. The organic substance may be used alone, or two or more kinds thereof may be used in combination.

A dispersion medium in which the substance to be dispersed such as the inorganic substances and/or the organic substances is dispersed is not particularly limited, and examples thereof may include as follows:

water;

fuel oils such as lamp oil, light oil, and kerosine;

aliphatic hydrocarbons such as hexane, isohexane, cyclohexane, methylcyclohexane, and isooctane;

aromatic hydrocarbons such as benzene, toluene, xylene, and cresol;

alcohols such as ethanol, methanol, isopropyl alcohol, butyl alcohol, and pentyl alcohol;

esters such as ethyl acetate and dioctyl phthalate;

ethers such as ethylene glycol, diethylene glycol, triethylene glycol, tetraethylene glycol, propylene glycol, polyethylene glycol, polypropylene glycol, ethylene glycol monobutyl ether, carbitol, monoglyme, diglyme, tetraglyme, methyl cellosolve, and butyl cellosolve;

diols such as butanediol, pentanediol, and hexanediol;

halogenated hydrocarbons such as 1,1,1-trichloroethane, trichloroethylene, dichloroethylene, and chlorodifluoromethane;

ketones such as methyl isoamyl ketone, methyl isobutyl ketone, acetone, and methyl ethyl ketone; and terpineol, liquid paraffin, mineral spirit, N-(2-hydroxyethyl)pyrrolidone, and glycerol.

Among these dispersion mediums, water is suitable. The dispersion medium may be used alone, or two or more kinds thereof may be used in combination.

<Dispersion Method, Dispersion Composition, and Method of Producing the Composition>

The dispersant of the present invention can be used in dispersing the substance to be dispersed in the dispersion medium. Thus, a dispersion composition containing the dispersant of the present invention, the dispersion medium, and the substance to be dispersed can be produced.

When dispersing the substance to be dispersed in the dispersion medium using the dispersant of the present invention, an addition order of the dispersant, the dispersion medium, and the substance to be dispersed is not particularly limited. For example, the substance to be dispersed may be added to a mixture of the dispersant of the present invention and the dispersion medium, or the dispersant of the present invention and the substance to be dispersed may be added simultaneously or sequentially to the dispersion medium. Alternatively, the substance to be dispersed may be added to the dispersion medium, followed by addition of the dispersant of the present invention.

Generally, the dispersant, the dispersion medium, and the substance to be dispersed are each added and then mixed. During the mixing, stirring may be performed. A mixing device and a temperature condition may be appropriately set according to conditions such as the kind and amount of each of the substance to be dispersed and the dispersion medium.

In the dispersion composition, it is preferable that the contained amount of the dispersant of the present invention relative to the substance relative to be dispersed is preferably 0.1% by weight to 1.0% by weight in terms of solid content.

The use amount of the dispersant of the present invention may be appropriately adjusted according to conditions such as the kind and amount of the substance to be dispersed, and is not particularly limited. For example, the use amount of the hydrolysate is preferably 0.001 parts by weight or more relative to 100 parts by weight of the substance to be dispersed. The upper limit is preferably 10 parts by weight or less. The use amount of the hydrolysate is preferably 0.001 parts by weight or more and 10 parts by weight or less relative to 100 parts by weight of the substance to be dispersed.

The use amount of the dispersion medium is not particularly limited, but is generally 20 parts by weight or more relative to 100 parts by weight of the substance to be dispersed. The upper limit is generally 1,000 parts by weight or less. The use amount of the dispersion medium is preferably 20 parts by weight or more and 1,000 parts by weight or less relative to 100 parts by weight of the substance to be dispersed.

The dispersant of the present invention is not limited as long as it contains the hydrolysate, and an optional component other than the hydrolysate may be contained. Examples of the other component may include at least one kind of compound selected from the group consisting of the following components (A) to (C):

the component (A): a compound having a carboxyl group and/or a salt thereof;

the component (B): a compound having an acid group and a polyalkylene glycol chain; and the component (C): a compound having a sulfonic acid group and/or a salt thereof.

In the following description, "(meth)acrylic acid" means acrylic acid or methacrylic acid. (Poly)oxyethylene means oxyethylene or polyoxyethylene.

The compound of the component (A) is not particularly limited as long as it has a carboxyl group and/or a salt thereof. Examples of the compound may include, but not limited to, sodium poly(meth)acrylate, sodium gluconate, and a partially neutralized metal salt of poly(meth)acrylic acid. The component (A) may be one kind of the compound or a combination of two or more kinds thereof.

The compound of the component (B) is not particularly limited as long as it has an acid group and a polyalkylene glycol chain. Examples of the compound may include, but not limited to, copolymers of (poly)oxyethylene methacrylate and (meth)acrylic acid, salts thereof, copolymers of (poly)oxyethylene allyl ether and (meth)acrylic acid, salts thereof, copolymers of (poly)oxyethylene allyl ether and maleic anhydride, salts thereof, copolymers of a (poly)oxyethylene adduct of 3-methyl-3-buten-1-ol and (meth)acrylic acid, salts thereof, copolymers of (poly)oxyethylene adduct of 3-methyl-3-buten-1-ol and maleic anhydride, and salts thereof. The component (B) may be one kind of the compound or a combination of two or more kinds thereof.

The compound of the component (C) is not particularly limited as long as it has a sulfonic acid group and/or a salt thereof. Examples of the compound may include, but not limited to, sodium lignin sulfonate, naphthalenesulfonic acid, naphthalenesulfonate formaldehyde condensate, and salts thereof. The component (C) may be one kind of the compound or a combination of two or more kinds thereof.

When the dispersant of the present invention contains one or more kinds of compounds selected from the group consisting of the components (A) to (C), the ratio by weight of the solid content of the hydrolysate relative to the solid content of the compound is not particularly limited. For example, when the dispersant of the present invention contains one kind of compound selected from the aforementioned group, the ratio of the solid content weight of the hydrolysate to the solid content weight of one kind of the compound selected from the aforementioned group is preferably 1 to 99/1 to 99, and more preferably 30 to 70/30 to 70.

When the dispersant of the present invention contains two kinds of different compounds (I) and (II) selected from the aforementioned group, the ratio of the solid content weight of the hydrolysate to the solid content weight of the compound (I) to the solid content weight of the compound (II) is preferably 1 to 99/1 to 99/1 to 99, and more preferably 10to 90/10 to 90/10 to 90.

When the dispersant of the present invention contains three kinds of different compounds (i), (ii), and (iii) that are selected from the aforementioned group, the ratio of the solid content weight of the hydrolysate to the solid content weight of the compound (i) to the solid content weight of the compound (ii) to the solid content weight of the compound (iii) is preferably 1 to 99/1 to 99/1 to 99/1 to 99, and more preferably 10 to 90/10 to 90/10 to 90/10 to 90.

The dispersant of the present invention may contain an additive as an optional component. Examples of the additive may include a preservative, a surfactant, a colorant, and a defoamer. One kind of the additive or two or more kinds thereof may be used. The contained amount of the additive may be appropriately determined according to conditions such as use of the dispersant and the kind of the additive.

When dispersing the substance to be dispersed in the dispersion medium using the dispersant of the present invention, another dispersant may be used in combination.

<Cement Dispersant>

The dispersant of the present invention may be used for various uses, and is suitable for use as a cement dispersant. Hereinafter, a cement dispersant of the present invention will be described in detail.

The cement dispersant of the present invention may have an aqueous solution form, a powder form, or another form. Examples of a method of preparing the cement dispersant in a powder form may include a method in which after a hydrolysis reaction, the dispersant is neutralized with a hydroxide of divalent metal such as calcium and magnesium to obtain a polyvalent metal salt, and the metal salt is dried and pulverized; a method in which the dispersant is supported on an inorganic powder such as silica-based fine powder, dried, and pulverized; a method in which the dispersant is dried and solidified by a drum-type drying apparatus, a disk-type drying apparatus, or a belt-type drying apparatus to form a thin film on a support, and the film is pulverized, and a method in which the dispersant is dried and solidified by a spray dryer to form a powder. The dispersant of the present invention may be mixed in advance in a cement composition not containing water, such as cement powder and dry mortar so as to be used as a premix product that is used for plastering, floor finishing, grouting, or the like, or the dispersant may be mixed during kneading the cement composition.

Cement targeting the cement dispersant of the present invention is not particularly limited. Examples thereof may include portland cement (for example, ordinary, early-strength, ultrahigh-early-strength, moderate-heat, sulfate resistance, and low alkaline forms thereof), mixed cement (for example, blast furnace cement, silica cement, and fly ash cement), white portland cement, alumina cement, ultra rapid-hardening cement (for example, one-clinker rapid-hardening cement, two-clinker rapid-hardening cement, and magnesium phosphate cement), cement for grout, cement for oil well, low-exothermic cement (for example, low-exothermic blast furnace cement, fly ash mixing low-exothermic blast furnace cement, and high-content belite cement), ultra-high strength cement, a cement-based solidification material, and ecocement (for example, cement produced from one or more kinds of municipal wastes incinerated ash and sewage sludge incineration ash as a raw material). The cement dispersant of the present invention may be used for a hydraulic material other than cement, such as gypsum.

The cement dispersant of the present invention may be used by addition to various types of hydraulic materials, that is, may be contained in a hydraulic composition, or may be contained in a hydraulic composition such as a cement composition.

The hydraulic composition of the present invention may contain such a hydraulic material and the cement dispersant of the present invention, and in general, further contains water. As the hydraulic composition, a hydraulic composition containing an aggregate such as a fine aggregate (sand, etc.) and a coarse aggregate (crushed stone, etc.) is obtained. Specific examples of the hydraulic composition may include cement paste, mortar, concrete, and plaster.

It is preferable that the hydraulic composition be a cement composition. It is more preferable that the cement composition be a hydraulic composition containing cement as a hydraulic material. The cement composition generally contains the dispersant of the present invention, the cement, and water as essential components.

The cement composition may contain fine powder such as blast furnace slag, fly ash, cinder ash, clinker ash, husk ash, silica fume, silica powder, and limestone powder, and gypsum. Examples of the aggregate may include gravel, crushed stone, water granulated slag, and a recycled aggregate. Other examples of the aggregate may include a fire-resistant aggregate such as silica fire-resistant aggregate, clayish fire-resistant aggregate, zircon fire-resistant aggregate, high alumina fire-resistant aggregate, silicon carbide fire-resistant aggregate, graphite fire-resistant aggregate, chromium fire-resistant aggregate, chrome magnesite fire-resistant aggregate, and magnesia fire-resistant aggregate.

The unit water amount per cubic meter of the cement composition, the use amount of cement, and the ratio (by weight) of water to cement are not particularly limited, and can be used widely from lean mixing to rich mixing.

The unit water amount per cubic meter is preferably 100 kg/m$^3$ or more, and more preferably 120 kg/m$^3$ or more. The upper limit is preferably 185 kg/m$^3$ or less, and more preferably 175 kg/m$^3$ or less. Therefore, the unit water amount per cubic meter is preferably 100 kg/m; or more and 185 kg/m$^3$ or less, and more preferably 120 kg/m$^3$ or more and 175 kg/m$^3$ or less.

The use amount of the cement composition is preferably 200 kg/m$^3$ or more, and more preferably 250 kg/m$^3$ or more. The upper limit is preferably 800 kg/m$^3$ or less, and more preferably 800 kg/m$^3$ or less. Therefore, the use amount is preferably 200 kg/m$^3$ or more and 800 kg/m$^3$ or less, and more preferably 250 kg/m$^3$ or more and 800 kg/m$^3$ or less.

The ratio (by weight) of water to cement in the cement composition is preferably 0.1 or more, and more preferably 0.2 or more. The upper limit is preferably 0.7 or less, and more preferably 0.65 or less. Therefore, the ratio is preferably 0.1 or more and 0.7 or less, and more preferably 0.2 or more and 0.65 or less.

The cement dispersant of the present invention can be used at a high water reduction ratio region, that is, a region where the water/cement ratio (by weight) is as low as 0.15 or more and 0.5 or less (preferably 0.15 or more and 0.4 or less). The cement dispersant is effective for high-strength concrete in which the unit cement amount is high and the water/cement ratio is low and lean mixed concrete in which the unit cement amount is 300 kg/m$^3$ or less.

The contained amount of the dispersant of the present invention in the cement composition is not particularly limited. For example, in the case of cement composition containing hydraulic cement (mortar, concrete, etc.), the contained amount of the dispersant is preferably 0.001% by weight or more in terms of solid content relative to the weight of cement. Therefore, the dispersion performance can be sufficiently exerted. The upper limit is preferably 10.0% by weight or less. Thus, substantial saturation of effects of improving the dispersibility can be avoided use amount of the dispersant of the present invention can be controlled to an appropriate amount, and an increase in production cost can be suppressed.

Therefore, the contained amount is preferably 0.001% by weight or more and 10.0% by weight or less. Accordingly, various preferable effects such as a decrease in unit water amount, an increase in strength, and improvement in durability may be obtained.

The cement composition of the present invention has high dispersibility and dispersion retentivity even at high water reduction ratio region, sufficiently exerts initial dispersibility and viscosity-reducing properties even at low temperature, and has excellent workability.

Therefore, the dispersant is effective for various types of concretes such as ready-mixed concrete, concrete for a concrete secondary product (precast concrete), concrete for centrifugal casting, concrete for vibrocompaction, steam cured concrete, and spraying concrete. The cement composition of the present invention is further effective for mortar and concrete that require high fluidity, such as medium fluidity concrete (concrete having slump value of 22 cm or more and 25 cm or less), high fluidity concrete (concrete having slump value of 25 cm or more and slump flow value of 50 cm or more and 70 cm or less), self-compacting concrete, and a self-leveling material.

The cement composition of the present invention may further contain a cement additive other than the dispersant of the present invention. Examples of the cement additive may include the following (1) to (11).

(1) Water-soluble polymer:
unsaturated carboxylic acid polymers such as polyacrylic acid, sodium polyacrylate, polymethacrylic acid, sodium polymethacylate, polymaleic acid, sodium polymaleate, and a sodium salt of acrylic acid-maleic acid copolymer;
non-ionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose;
polysaccharide derivatives obtained by substituting hydrogen atoms of a part or all of hydroxy groups of alkylated or hydroxyalkylated derivative of a polysaccharide with a hydrophobic substituent having a hydrocarbon chain having 8 to 40 carbon atoms as a substructure and an ionic hydrophilic substituent having a sulfonic acid group or a salt thereof as a substructure, the polysaccharide being for example methyl cellulose, ethyl cellulose, hydroxyethyl cellulose, or hydroxypropyl cellulose;
yeast glucan;
xanthum gum;
polysaccharides produced by microbial fermentation, such as β-1,3-glucans (may be linear or branched, examples thereof may include curdlan, paramylon, pachyman, scleroglucan, and laminaran);
polyacrylamide;
polyvinyl alcohol;
starch;
starch phosphoric acid ester;
sodium alginate;
gelatin; and
a copolymer of acrylic acid having an amino group in the molecule, and a quaternary compound thereof.

(2) Polymer emulsion: copolymers of various types of vinyl monomers such as alkyl (meth)acrylate.

(3) Hardening retarder other than an oxycarboxylic acid-based compound:
(3-1) saccharides
monosaccharides such as glucose, fructose, galactose, sucrose, xylose, apiose, ribose, and isomerized sugar,
oligosaccharides such as a disaccharide and a trisaccharide;
oligosaccharides such as dextrin;
polysaccharides such as dextran; and
molasses including the saccharides.
(3-2) Other
sugar alcohols such as sorbitol;
magnesium hexafluorosilicate;
phosphate, salts thereof, and boric acid ester;
aminocarboxylic acid and salts thereof;
alkali-soluble proteins;
humic acid;
tannic acid;
phenol;
polyhydric alcohols such as glycerol;
phosphonic acids such as aminotri(methylenephosphonic acid), 1-hydroxyethylidene-1,1-diphosphonic acid, ethylenediamine tetra(methylene phosphonic acid), and diethylene triamine penta(methylenephosphonic acid); and
phosphonic acid derivatives such as alkaline metal salts of phosphonic acid and alkaline earth metal salts of phosphonic acid.

(4) High-early-strength agent and accelerator:
soluble calcium salts such as calcium chloride, calcium nitrite, calcium nitrate, calcium bromide, and calcium iodide;
chlorides such as iron chloride and magnesium chloride;
sulfates;
potassium hydroxide;
sodium hydroxide;
carbonates;
thiosulfates;
formic acid and formic acid salt such as calcium formate;
alkanol amine;
alumina cement; and
calcium aluminate silicate.

(5) Defoamer other than oxyalkylene-based defoamer:
mineral oil-based defoamers such as kerosene and liquid paraffin;
oil-based defoamers such as animal and plant oils, sesame oil, castor oil, and alkylene oxide adducts thereof;
fatty acid-based defoamers such as oleic acid, stearic acid, and alkylene oxide adducts thereof;
fatty acid ester-based defoamers such as glycerol monoricinoleate, alkenylsuccinic acid derivatives, sorbitol monolaurate, sorbitol trioleate, and natural wax;
alcohol-based defoamers such as octyl alcohol, hexadecyl alcohol, acetylene alcohol, and glycols;
amide-based defoamers such as acrylate polyamine;
phosphoric acid ester-based defoamers such as tributyl phosphate and sodium octyl phosphate;
metal soap-based defoamers such as aluminum stearate and calcium oleate; and
silicone-based defoamers such as dimethyl silicone oil, silicone paste, silicone emulsion, organic modified polysiloxane (polydiorganosiloxane such as dimethyl polysiloxane), and fluorosilicone oil.

(6) AE agent:
resin soap, saturated or unsaturated fatty acid, sodium hydroxystearate, lauryl sulfate, ABS (alkylbenzenesulfonic acid), LAS (linear alkylbenzenesulfonic acid), alkanesulfonate, polyoxyethylene alkyl(phenyl) ether, polyoxyethylene alkyl(phenyl) ether sulfate ester or salts thereof, polyoxyethylene alkyl(phenyl) ether phosphate ester or salts thereof, protein materials, alkenylsulfosuccinc acid, and α-olefin sulfonate.

(7) Another surfactant:

aliphatic monohydric alcohols having 6 to 30 carbon atoms in the molecule such as octadecyl alcohol and stearyl alcohol;

alicyclic monohydric alcohols having 6 to 30 carbon atoms in the molecule such as abietyl alcohol;

monohydric mercaptans having 6 to 30 carbon atoms in the molecule such as dodecyl mercaptan; alkyl phenols having 6 to 30 carbon atoms in the molecule such as nonylphenol;

amines having 6 to 30 carbon atoms in the molecule such as dodecyl amine;

polyalkylene oxide derivatives in which 10 mol or more of alkylene oxide such as ethylene oxide and propylene oxide is added to carboxylic acid having 6 to 30 carbon atoms in the molecule such as lauric acid and stearic acid;

alkyl diphenyl ether sulfonate salts that may have a substituent such as an alkyl group and an alkoxy group, comprising two phenyl groups having a sulfone group which are bonded each other through a ether bond;

various anionic surfactants;

various cationic surfactants such as alkyl amine acetate and alkyl trimethyl ammonium chloride;

various nonionic surfactants; and various amphoteric surfactants.

(8) Waterproof agent:

fatty acid (salts), fatty acid esters, oils and fats, silicone, paraffin, asphalt, and waxes.

(9) Rust preventive agent:

nitrite, phosphate, and zinc oxide.

(10) Cracking reducing agent:

polyoxyethylene alkyl ether.

(11) Expansive material:

ettringite-based expansive material and coal-based expansive material.

Examples of the other cement additive (material) may include a cement wetting agent, a thickener, a separation reducing agent, a flocculant, a dry shrinkage reducing agent, a strength increasing agent, a self-leveling agent, a rust preventive agent, a colorant, and a fungicide. The cement additive (material) may be used alone, or two or more kinds thereof may be used in combination.

EXAMPLES

Hereinafter, the present invention will be described specifically with reference to Examples, but is not limited to these Examples. In Examples, % represents % by weight, and part(s) represents part(s) by weight, unless otherwise noted.

Production Example 1

Production of Hydrolysis Treatment Liquid 1

Hardwood chips in an absolute dry amount of 300 g were placed in a 2.4-L rotation-type autoclave, and water was added so that the liquid ratio was 2 L/kg. The mixture was held at 170° C. for 30 minutes, and hydrolyzed at a pH of 3.5. A neutralization liquid was added, resulting in neutralization at 155° C. for 15 minutes. The neutralization liquid was prepared by mixing sodium hydroxide and sodium sulfide so that the active alkali was 11% (relative to the weight of the chips), the sulfidity was 25%, and the liquid ratio was 2.5 L/kg. After the neutralization, the liquid was taken from the autoclave, and concentrated using a rotary evaporator so that the solid content was 20% by weight. Thus, a hydrolysis treatment liquid 1 having a weight average molecular weight of 2,700 was obtained. Chemical components of the hydrolysis treatment liquid 1 are shown in Table 1.

A chemical composition of the hydrolysis treatment liquid 1 is shown in Table 1. Each component in each Production Example, and measurement conditions of weight average molecular weight are as follows.

<Quantitative Determination of Constituent Saccharides>

Among constituent saccharides, monosaccharides were detected by an ELSD-HPLC method. To a polysaccharide and an oligosaccharide, 1 M TFA was added in an amount two times the weight of solid content of the hydrolysis treatment liquid, and the mixture was heated at 105° C. for 3 hours resulting in complete hydrolysis. After that, the amounts of the polysaccharide and the oligosaccharide were determined as monosaccharides by HPLC.

<Lignin>

Lignin was measured in accordance with a method for measuring a methoxyl group on the basis of Method of Viebock and Schwappach (see "Methods in lignin chemistry," pp. 336 to 340, 1994, Uni Press Co.). As the amount of lignin, the amount of the methoxyl group was used.

<Organic Acid>

An organic acid was measured by an ion-exclusion HPLC post-column chromatography reaction visible light detection method.

<Oils>

The amount of n-hexane extract was calculated in accordance with JIS-K0102, and noted as oils.

<Furan>

Furan was measured by an HPLC-UV method.

<Ash Content>

A sample was weighed in an ashing vessel, moisture was removed by an electric heater, and the sample was measured in accordance with JIS-P8002.

<Weight Average Molecular Weight (Mw)>

High performance liquid chromatography of GPC mode was performed using the following column and mobile phase, and a molecular weight-retention time standard curve was formed using a pullulan having a known molecular weight. The weight average molecular weight of the sample was measured with reference to the curve.

Column: combination of OH pak SB806HQ+SB804HQ+SB802.5HQ (all columns were manufactured by Showa Denko K.K.)

Mobile phase: aqueous sodium tetraborate (0.05 M) solution

Standard substance: pullulan having a known molecular weight

Device: high performance liquid chromatography device of GPC mode

TABLE 1

CHEMICAL COMPOSITION OF HYDROLYSIS TREATMENT LIQUID 1

| COMPONENT | RATIO (%) |
| --- | --- |
| GLUCOSE | 2.6 |
| MANNOSE | 5.8 |

TABLE 1-continued

CHEMICAL COMPOSITION OF HYDROLYSIS TREATMENT LIQUID 1

| COMPONENT | RATIO (%) |
|---|---|
| ARABINOSE | 3.4 |
| XYLOSE | 7.4 |
| GALACTOSE | 6.2 |
| POLYSACCHARIDE AND OLIGOSACCHARIDE (TOTAL) | 64.3 |
| (GLUCOMANNAN) | 7.7 |
| (GLUCURONOXYLAN) | 44.9 |
| LIGNIN | 4.3 |
| ORGANIC ACID | 1.1 |
| OILS | 0.1 |
| FURAN | 0.3 |
| ASH CONTENT | 2.8 |
| OTHER | 1.7 |

Production Example 2

Production of Hydrolysis Treatment Liquid 2

Softwood chips in an absolute dry amount of 300 g were placed in a 2.4-L rotation-type autoclave, and water was added so that the liquid ratio was 3.2 L/kg. The mixture was held at 170° C. for 30 minutes, and hydrolyzed at a pH of 3.8. A neutralization liquid was added, resulting in neutralization at 155° C. for 15 minutes. The neutralization liquid was prepared by mixing sodium hydroxide and sodium sulfide so that the active alkali was 11% (relative to the weight of the chips), the sulfidity was 25%, and the liquid ratio was 3.2 L/kg. After the neutralization, the liquid was taken from the autoclave, and concentrated using a rotary evaporator so that the solid content was 20% by weight. Thus, a hydrolysis treatment liquid 2 having a weight average molecular weight of 2,100 was obtained. A chemical composition of the hydrolysis treatment liquid 2 is shown in Table 2.

TABLE 2

CHEMICAL COMPOSITION OF HYDROLYSIS TREATMENT LIQUID 2

| COMPONENT | RATIO (%) |
|---|---|
| GLUCOSE | 2.1 |
| MANNOSE | 6.6 |
| ARABINOSE | 4.1 |
| XYLOSE | 4.9 |
| GALACTOSE | 6.6 |
| POLYSACCHARIDE AND OLIGOSACCHARIDE (total) | 66.9 |
| (GLUCOMANNAN) | 40.7 |
| (GALACTAN) | 8.9 |
| (ARABINOXYLAN) | 1.7 |
| LIGNIN | 3.5 |
| ORGANIC ACID | 0.7 |
| OILS | 0.1 |
| FURAN | 0.1 |
| ASH CONTENT | 1.9 |
| OTHER | 2.5 |

Production Example 3

Production of Hydrolysis Treatment Liquid 3

The hydrolysis treatment liquid 1 was subjected to ultrafiltration to prepare a 3-times concentrated liquid. Thus, a hydrolysis treatment liquid 3 having a weight average molecular weight of 4,500 was obtained. For the ultrafiltration, a flat membrane test machine UHP-76 (molecular weight cutoff: $1\times10^3$) manufactured by Toyo Roshi Kaisha, Ltd., was used. A chemical composition of the hydrolysis treatment liquid 3 is shown in Table 3.

TABLE 3

CHEMICAL COMPOSITION OF HYDROLYSIS TREATMENT LIQUID 3

| COMPONENT | RATIO (%) |
|---|---|
| GLUCOSE | 3.3 |
| MANNOSE | 5.6 |
| ARABINOSE | 5.8 |
| XYLOSE | 3.6 |
| GALACTOSE | 1.6 |
| POLYSACCHARIDE AND OLIGOSACCHARIDE (total) | 70.2 |
| (GLUCOMANNAN) | 55.7 |
| (GALACTAN) | 9.2 |
| (ARABINOXYLAN) | 1.8 |
| LIGNIN | 3.1 |
| ORGANIC ACID | 0.5 |
| OILS | 0.1 |
| FURAN | 0.1 |
| ASH CONTENT | 0.1 |
| OTHER | 6 |

[Bottom Notes in Tables]

The ratio of each component in Tables 1 to 3 is a ratio (%) by weight of the component relative to the total weight (solid content) of each hydrolysis treatment liquid except for moisture content.

Examples 1 to 4 and Comparative Examples 1 to 4

A fine aggregate, cement, water, and a dispersant were charged into a mortar mixer, and mechanically kneaded by the mortar mixer to prepare a mortar. A chemical composition of the fine aggregate, cement, and water is shown in Table 4, and the amount of added dispersant is shown in Table 5. The mortar flow, setting time, and air content of the obtained mortar were evaluated.

The mortar flow was evaluated by the following procedure. A hollow-cylindrical compact slump cone with a diameter of bottom face of 20 cm, a diameter of upper face of 10 cm, and a height of 30 cm was charged with the mortar. An average of diameters in two directions of the mortar that spread on a table during vertical lifting of the compact slump cone was taken as a mortar flow value. When the addition amount is smaller and the mortar flow value is larger, the performance of the dispersant is judged to be favorable. Each air content in the mortar using each dispersant was adjusted to the same air content using an AE agent and a defoamer, and a test was then performed. The results are shown in Table 4.

The setting time was evaluated by the following procedure. The mortar was poured into a container covered with a heat insulating material. A change of mortar temperature with time was checked using a time-dependent temperature measurement device. The time at which the temperature reached a maximum temperature was taken as the setting time of the mortar. In general, when the setting time is shorter, the dispersant is judged to be good.

The air content was evaluated by the following procedure. A cylindrical container was charged with the mortar, the weight of the charged mortar was measured, and the air content was calculated by the following (Expression 1).

Air content (%)=(weight of charged mortar/weight of mortar with air content of 0%)×100     (Expression 1)

The specific gravity (calculated value) of the mortar was first calculated from the specific gravities of water, cement, and sand. The weight of mortar with an air content of 0% in (Expression 1) was then calculated by the following (Expression 2).

Weight of mortar with air content of 0%=specific gravity (calculated value) of mortar×volume of cylindrical container       (Expression 2)

TABLE 4

| W/C % | UNIT AMOUNT g | | |
|---|---|---|---|
| | WATER | CEMENT | LAND SAND |
| 52.5 | 329 | 627 | 1756 |

The used materials are as follows.
Cement:
ordinary portland cement (available from Ube-Mitsubishi Cement Corporation, specific gravity: 3.16)
ordinary portland cement (available from Taiheiyo Cement Corporation, specific gravity: 3.16)
ordinary portland cement (available from Tokuyama Corporation, specific gravity: 3.16)
Water: tap water
Land sand: land sand from Kakegawa-Shi, Shizuoka Prefecture (fine aggregate, specific gravity: 2.59)
Dispersant (in terms of solid content): see Table 5

Examples 5 to 7, and Comparative Example 5

A fine aggregate, cement, water, and a dispersant were charged into a mortar mixer, and mechanically kneaded by the mortar mixer to prepare a mortar. A chemical composition of the fine aggregate, cement, and water is shown in Table 6, and the amount of added dispersant is shown in Table 7. The mortar flow, setting time, and air content of the obtained mortar were evaluated in the same manner as in Example 1.

TABLE 6

| W/C % | UNIT AMOUNT g | | |
|---|---|---|---|
| | WATER | CEMENT | LAND SAND |
| 45 | 312 | 693 | 1670 |

The used materials are as follows.
Cement:
ordinary portland cement (available from Ube-Mitsubishi Cement Corporation, specific gravity: 3.16)
ordinary portland cement (available from Taiheiyo Cement Corporation, specific gravity: 3.16)
ordinary portland cement (available from Tokuyama Corporation, specific gravity: 3.16)
Water: tap water
Land sand: land sand from Kakegawa-Shi, Shizuoka Prefecture (fine aggregate, specific gravity: 2.59) Dispersant (in terms of solid content): see Table 7

TABLE 5

| | | WEIGHT AVERAGE MOLECULAR WEIGHT Mw | ADDITION AMOUNT WEIGHT OF DISPERSANT/ WEIGHT OF CEMENT % | MORTAR FLOW mm | SETTING TIME hr | AIR CONTENT % |
|---|---|---|---|---|---|---|
| EXAMPLE 1 | HYDROLYSIS TREATMENT LIQUID 1 | 2700 | 0.4 | 221 | 17 | 4.4 |
| | | | 0.7 | 231 | 48< | 4.9 |
| | | | 1 | 238 | 48< | 4.6 |
| EXAMPLE 2 | HYDROLYSIS TREATMENT LIQUID 2 | 2100 | 0.4 | 222 | 17.5 | 4.7 |
| | | | 0.7 | 233 | 48< | 4.6 |
| | | | 1 | 239 | 48< | 4.7 |
| EXAMPLE 3 | HYDROLYSIS TREATMENT LIQUID 3 | 4500 | 0.4 | 226 | 16.5 | 4.2 |
| | | | 0.7 | 235 | 48< | 4.5 |
| | | | 1 | 242 | 48< | 4.5 |
| EXAMPLE 4 | HYDROLYSIS TREATMENT LIQUID 1 + LIGNIN SULFONIC ACID (*1) 50/50 (BY WEIGHT) | 4560 | 0.5 | 220 | 18 | 4.3 |
| | | | 0.8 | 239 | 35.5 | 4.2 |
| | | | 1.1 | 232 | 48< | 4.1 |
| COMPARATIVE EXAMPLE 1 | LIGNIN SULFONIC ACID (*1) | 12000 | 0.4 | 292 | 12 | 4.4 |
| | | | 0.7 | 205 | 16 | 4.5 |
| | | | 1 | 217 | 19.5 | 4.9 |
| COMPARATIVE EXAMPLE 2 | SODIUM GLUCONATE (*2) | 218 | 0.4 | 210 | 20 | 4.4 |
| | | | 0.7 | 218 | 48< | 4.2 |
| | | | 1 | 225 | 48< | 4.7 |
| COMPARATIVE EXAMPLE 3 | SOY POLYSACCHARIDE (*3) | 120000 | 0.4 | 168 | 17 | 4.3 |
| | | | 0.7 | 179 | 25 | 4.6 |
| | | | 1 | 186 | 29 | 4.3 |
| COMPARATIVE EXAMPLE 4 | DEXTRIN (*4) | 1700 | 0.4 | 200 | 18.5 | 4.5 |
| | | | 0.7 | 216 | 48< | 4.8 |
| | | | 1 | 221 | 48< | 4.5 |

[Bottom Notes in Table 5]
(*1) lignin sulfonic acid-based cement dispersant: trade name SUNFLO-RH available from Nippon Paper Industries Co., Ltd.
(*2) sodium gluconate-based cement dispersant: trade name C-PARN available from Fuso Chemical Co., Ltd.
(*3) soya polysaccharides: trade name SOYAFIBE S-DN available from Fuji Oil Co., Ltd.
(*4) starch hydrolysate: trade name pinedex #2 available from Matsutani Chemical Industry Co., Ltd.
"<48" means that coagulation is not achieved in 48 hours.

A polymer A was produced in the same manner as in Example 1 in Japanese Patent Application Laid-Open No. 2000-239595. Specifically, 173 g of pure water, 180 g (2.5 mol) of acrylic acid, and 174 g (1.35 mol) of an aqueous 31% NaOH solution were mixed and stirred to prepare a mixed liquid a. In a 1,000-mL flask equipped with a stirrer, a thermometer, and a reflux condenser, 163 g of pure water was placed, and heated to 80° C. with stirring. To the flask, the prepared mixed liquid a and 60.0 g of aqueous 12% by weight ammonium persulfate solution were each independently added dropwise simultaneously over 3 hours. After completion of the dropwise addition, the mixture was aged for 2 hours to obtain an aqueous solution of partially neutralized metal salt of polyacrylic acid (polymer A). The resulting aqueous solution was concentrated to 40% by weight. The weight average molecular weight of the polymer A was 14,000, and the pH was 5.0.

A polymer B was produced in the same manner as in paragraph [0051] in Japanese Patent Application Laid-Open No. 2011-057459. Specifically, in a glass reaction container equipped with a thermometer, a stirrer, a reflux condenser, a nitrogen inlet tube, and a dropping device, 247 parts by weight of water, 578 parts by weight of polyethylene glycol monoallyl ether (average additional amount by mole of ethylene oxide: 10), and 8 parts by weight of a compound in which 3-position and 3'-position of 4,4'-dihydroxydiphenylsulfone were substituted with allyl were charged. Inside air of the reaction container was replaced with nitrogen gas while stirring, and the mixture was heated to 100° C. in a nitrogen gas atmosphere. After that, a monomer aqueous solution in which 130 parts by weight of acrylic acid and 618 parts by weight of water were mixed, and a mixed liquid of 14 parts by weight of ammonium persulfate and 186 parts by weight of water were each continuously added dropwise to the mixture in the reaction container over 1 hour while the temperature of reaction mixture was maintained at 100° C. The temperature of the resulting reaction mixture was further maintained at 100° C., and the reaction was caused for 1 hour to obtain an aqueous solution of a copolymer (polymer B). The contained amount of unsaturated polyethylene glycol alkenyl ether was 19% by weight. The pH of this liquid was adjusted to 7 by an aqueous 30% NaOH solution, to obtain an aqueous solution of the copolymer having a weight average molecular weight of 18,300.

TABLE 7

| | | ADDITION AMOUNT WEIGHT OF DISPERSANT/ WEIGHT OF CEMENT % | MORTAR FLOW mm | SETTING TIME hr | AIR CONTENT % |
|---|---|---|---|---|---|
| EXAMPLE 5 | HYDROLYSIS TREATMENT LIQUID 1 + POLYMER A (*5) 50/50 (RATIO BY WEIGHT OF EACH SOLID CONTENT) | 0.17 0.21 0.23 | 180 200 223 | 16 18 20 | 4.5 4.6 4.7 |
| EXAMPLE 6 | HYDROLYSIS TREATMENT LIQUID 1 + POLYMER B (*6) 50/50 (RATIO BY WEIGHT OF EACH SOLID CONTENT) | 0.17 0.21 0.23 | 170 190 210 | 14 15 16 | 4.5 4.6 4.3 |
| EXAMPLE 7 | HYDROLYSIS TREATMENT LIQUID 1 + NAPHTHALENE SULFONIC ACID (*7) 50/50 (RATIO BY WEIGHT OF EACH SOLID CONTENT) | 0.19 0.23 0.25 | 172 193 215 | 10 12 15 | 4.3 4.6 4.3 |
| COMPARATIVE EXAMPLE 5 | LIGNIN SULFONIC ACID (*1) | 2 2.5 3 | 221 223 225 | 30 48< 48< | 4.4 4.3 4.5 |

[Bottom Notes in Table 7]
(*1) lignin sulfonic acid-based cement dispersant: trade name SUNFLO-RH available from Nippon Paper Industries Co., Ltd.
(*5) As the polymer A, a polymer described in Example 1 in Japanese Patent Application Laid-Open No. 2000-239595 was used.
(*6) As the polymer B, A-1 described in Japanese Patent Application Laid-Open No. 2011-057459 was used.
(*7) naphthalenesulfonic acid was a naphthalene sulfonate formaldehyde condensate-based dispersant (available from Flowric Co., Ltd. (product name: FLOWRIC PS))
"<48" means that coagulation is not achieved in 48 hours.

As apparent from Tables 5 and 7, even when the addition amount of the dispersant in the cement composition of each Example was small, the mortar flow that was the same as in each Comparative Example is obtained. Therefore, the cement composition of each Example has high performance. The setting time of the cement composition of the cement composition of each Example was shorter than that of each Comparative Example.

The cement compositions of Examples 4 to 7 using the hydrolysis treatment liquid and the other component exhibited more excellent mortar flow values and setting time. In Example 4 using the hydrolysis treatment liquid and lignin sulfonic acid in combination, although the addition amount was small, high mortar flow was obtained as compared with Comparative Example 5 using lignin sulfonic acid alone. This shows that dispersibility is excellent. In Example 4, the setting time was shorter than that in Comparative Example 5. Among Examples 4 to 7, Example 6 using the polymer B in combination exhibited high cement dispersibility, and shorter setting time.

These results show that the dispersant of the present invention exerts excellent dispersibility in cement, and the setting of the cement composition containing the dispersant can be controlled appropriately according to demands of uses and the like. These results show that the dispersant of the present invention can impart excellent dispersibility even when it is applied to another substance to be dispersed.

Example 8

5 g of titanium dioxide was weighted in a 50-mL measuring cylinder. Subsequently, the hydrolysis treatment liquid 1 produced in accordance with Production Example 1 and ion-exchanged water were added to prepare a dispersion composition so that the final concentration of solid content of the hydrolysis treatment liquid 1 in the dispersion composition was 0.1% by weight. This measuring cylinder was mounted in a shaker, and shaken at a rate of 350 rpm/min for 30 seconds. The cylinder was allowed to stand at room temperature for 24 hours, and the syneresis ratio was measured. The dispersibility was judged. As the syneresis ratio, a ratio of supernatant relative to the whole volume of the measuring cylinder was calculated. When the syneresis ratio is 5% or less, the dispersibility can be evaluated to be favorable.

Example 9

Evaluation was performed in the same manner as in Example 8 except that calcium carbonate was used in place of titanium dioxide.

The syneresis ratios in Examples 8 and 9 were 3% and 4%, respectively. These results show that the dispersant of the present invention can exert favorable dispersibility in a substance other than cement, such as an inorganic substance, and is useful as a dispersant for the inorganic substance.

The invention claimed is:

1. A dispersant, comprising:
   a hydrolysate of a lignocellulosic material; and
   at least one selected from the group consisting of:
   (A) at least one of a sodium a poly(meth)acrylate, sodium gluconate,
       and a partially neutralized metal salt of a poly(meth)acrylic acid,
   (B) a compound having an acid group and a polyalkylene glycol chain,
       and
   (C) a compound having a sulfonic acid group, a salt thereof, or both, wherein:
   the hydrolysate comprises an oligosaccharide, a polysaccharide, or both, and a lignin;
   a contained amount of the oligosaccharide, the polysaccharide, or both, in the hydrolysate is 50% by weight to 80% by weight relative to a solid content of a hydrolysate; and
   a contained amount of the lignin in the hydrolysate is 1 to 10% by weight relative to the solid content of the hydrolysate.

2. The dispersant according to claim 1, wherein the hydrolysate has a weight average molecular weight of 1,000 to 5,000.

3. The dispersant according to claim 1, comprising at least one selected from the group consisting of:
   (A) the at least one of the sodium a poly(meth)acrylate, the sodium gluconate, and the partially neutralized metal salt of a poly(meth)acrylic acid;
   (B) at least one of: a copolymer of a (poly)oxyethylene methacrylate and (meth)acrylic acid, a copolymer of a (poly)oxyethylene allyl ether and (meth)acrylic acid, a copolymer of a (poly)oxyethylene allyl ether and maleic anhydride, a copolymer of a (poly)oxyethylene adduct of 3-methyl-3-buten-1-ol and (meth)acrylic acid, a copolymer of a (poly)oxyethylene adduct of 3-methyl-3-buten-1-ol and maleic anhydride, and salts thereof; and
   (C) the compound having a sulfonic acid group, a salt thereof, or both.

4. The dispersant according to claim 1, which is adapted to function as a dispersant for an inorganic substance.

5. The dispersant according to claim 1, which is adapted to function as a dispersant for an organic substance.

6. The dispersant according to claim 1, which is adapted to function as a dispersant for a cement.

7. A composition, comprising;
   the dispersant according to claim 1;
   a substance to be dispersed; and
   a dispersion medium.

8. The composition according to claim 7, wherein the substance to be dispersed is a hydraulic material.

9. The composition according to claim 8, wherein the hydraulic material comprises a cement.

10. A hydraulic composition, comprising:
    the dispersant according to claim 1; and
    a hydraulic material.

11. A cement composition, comprising:
    the dispersant according to claim 1; and
    a cement.

12. A method of producing a dispersion composition, the method comprising:
    dispersing a substance to be dispersed and a dispersion medium in the presence of the dispersant according to claim 1.

13. A dispersion composition, comprising a substance dispersed in a dispersion medium in the presence of the dispersant according to claim 1.

* * * * *